July 12, 1955

R. J. HERBOLD 2,712,694

APPARATUS FOR ENLARGING A LINEAR GRAPH

Filed March 4, 1952

INVENTOR.
Robert J. Herbold.
BY
Clayton T. Jenks

July 12, 1955

R. J. HERBOLD 2,712,694

APPARATUS FOR ENLARGING A LINEAR GRAPH

Filed March 4, 1952

Robert J. Herbold, INVENTOR.

BY Clayton L. Jenks

July 12, 1955

R. J. HERBOLD 2,712,694

APPARATUS FOR ENLARGING A LINEAR GRAPH

Filed March 4, 1952

INVENTOR.
Robert J. Herbold.
BY
Clayton L. Jenks

United States Patent Office 2,712,694
Patented July 12, 1955

2,712,694

APPARATUS FOR ENLARGING A LINEAR GRAPH

Robert J. Herbold, Denver, Colo., assignor to Lafayette M. Hughes, Denver, Colo.

Application March 4, 1952, Serial No. 274,814

6 Claims. (Cl. 33—23)

This invention relates to apparatus for enlarging a linear graph or curve.

Various types of linear graphs or curves may be made manually, mechanically or photographically, but limitations of the recording equipment may require that the graph be very small in dimensions and therefore difficult to inspect and interpret unless it can be magnified. Photography is a standard method of enlarging, but it is not desirable to use this method to enlarge an oscillograph screen record of a complex wave design, for example. The oscillograph light spot on the screen is comparatively large, and a photographic record of its movement is ordinarily made on a small film to produce a reduced sized image that is sharp. If, however, an attempt is made to enlarge that film graph photographically, then of course the image line itself is broadened as well as having its x- and y-dimensions expanded. The same considerations apply to the magnification of other types of mechanically or manually produced graphs.

The primary purpose of this invention is to provide an apparatus for expanding or magnifying the coordinates of a linear graph without broadening or enlarging the width of the graph line itself.

A further object is to provide apparatus of this type whereby the directions of the curve relative to x- and y-coordinates of a linear curve may be varied uniformly but either to different magnifications or equally, so as to accentuate either of the coordinates relative to the other or to magnify both to required selected extents.

Another object is to provide apparatus of this type in which the coordinate expansion of the curve may be made substantially uniform as to one axis, and to a suitable extent under the control of the operator, while the other axis expansion of the curve is automatically effected by moving a stylus in a timed relation with the follower and through a distance which may be independently varied.

A further object is to provide mechanism for reproducing at a desired magnification the movement of a graph follower which is moved laterally by manually operated mechanism to follow a uniformly moving graph, and wherein the reproducing stylus is moved automatically by and in timed relation with the follower movement, and the relative movements of the stylus and the record strip may be varied to vary the magnification independently as to either coordinate of the curve. Further objects will be apparent in the following disclosure.

In accordance with this invention, I have provided an apparatus whereby an original curve or linear graph to be magnified is mounted for a uniform mechanical movement in the direction of one coordinate axis of the graph, while it is viewed by the operator through a microscope mounted to be moved manually laterally of and perpendicular to said axis or direction of graph movement. A separate record strip, such as paper, is mounted for a uniform mechanical movement in a direction related to the graph movement, and a recording stylus is movable laterally of and perpendicular to the strip movement and arranged to mark the strip as it moves. The strip movement is selected to be proportional to, and usually several times greater than, the graph movement so that this movement of the strip relative to the sylus serves to magnify the graph as to one graph coordinate. The stylus is moved mechanically in a selected proportional ratio to the lateral microscope movement, as determined by the operator's control. This stylus movement is preferably effected by means of a Selsyn generator-motor set, so that the lateral movement of the stylus is in a direct relation to the microscope movement. Thus the compound relative movement of stylus and strip provides a magnification of the original graph as to either or both coordinates and the width or sharpness of the final graph is not affected by the magnification.

Referring to the drawings illustrating one embodiment of the invention:

Figure 1:
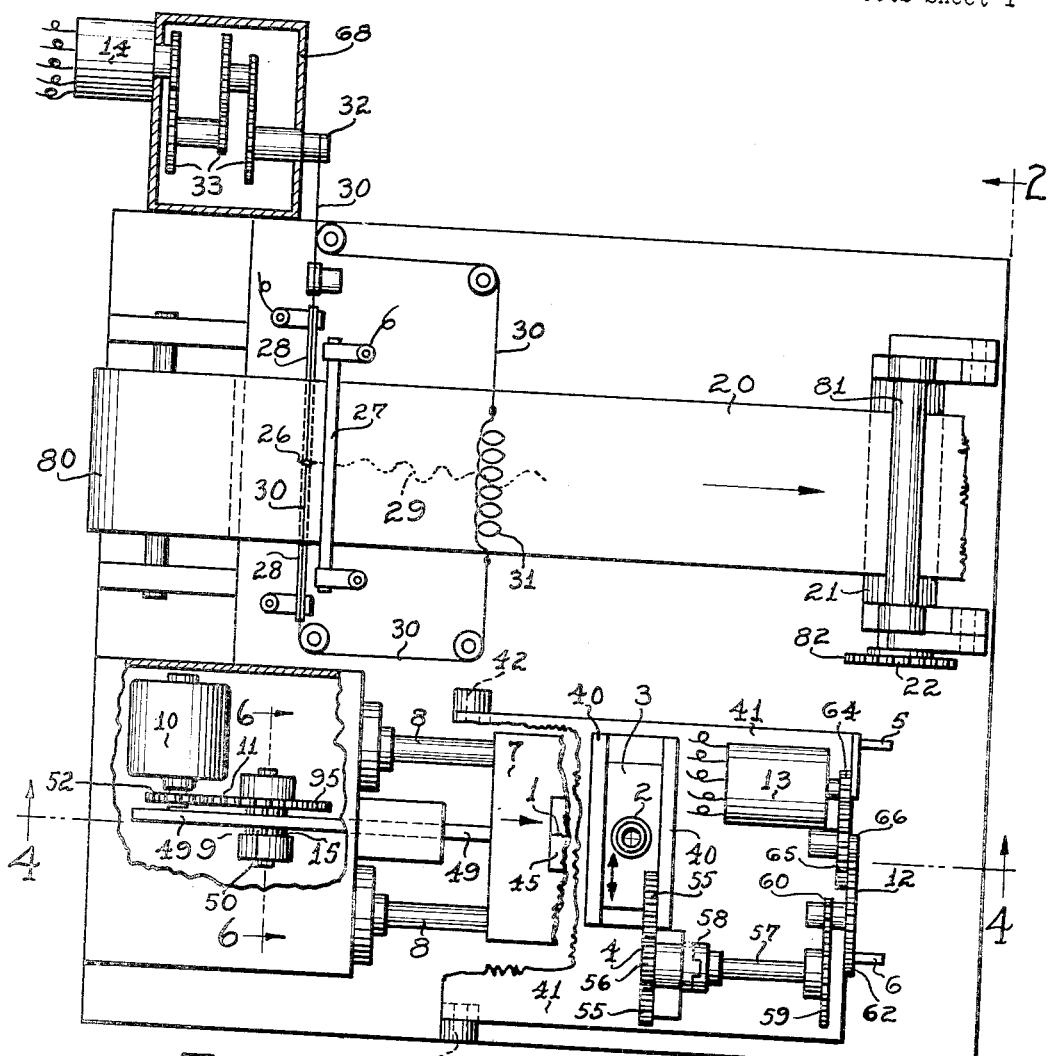
Fig. 1 is a top plan view, partly broken away and with parts removed, of both the graph viewing and the recording portions of the apparatus.

The preferred form of apparatus shown in the drawings comprises a device for scanning a film graph 1 and making an enlargement, or even a reduction, in either the x- or y-axis coordinate, or both, in any desired relative proportions. To this end, and as shown primarily in Fig. 1, a suitable microscope 2 has its cross-hairs or other locating feature movably mounted on a slide 3 and arranged to be focused on and follow the graph as the latter is moved uniformly in one direction. The movement of the microscope is employed to control a stylus or scribing device which produces the final desired curve. The slide 3 is moved laterally relative to one axis, such as the y-axis coordinate of the graph, by a rack and pinion device 4, while the graph is being moved at a steady rate lengthwise or along its x-axis coordinate. The microscope driving rack is secured at one end to the slide 3, and its pinion is driven manually by means of hand operated mechanism, such as a slow speed crank device 5 connected through gearing with the pinion. A fast speed crank mechanism 6 likewise operated manually is connected to the same pinion, and these two cranks are so arranged that they may move the microscope either slowly or rapidly, so that the cross-hairs may be made to follow the curve of the film graph as the latter is moved longitudinally beneath the microscope.

This graph 1, which may be on a photographic film or plate, for example, is suitably supported on a carrier 7 mounted to be moved along slideways 8 by a further rack and pinion device 9 comprising a pinion rotated by a constant speed electric motor 10 operating through a reduction gear unit 11. That unit may have its gear combination varied suitably, such as by changing a gear, or the rotational speed of the pinion may be otherwise varied, such as by means of a variable speed electric motor. Thus the graph film on its carrier or slide 7 is driven lengthwise of one coordinate at a constant speed beneath the cross-hairs of the microscope, while the microscope is moved laterally relative to the direction of motion of the film graph by means of the manually operated cranks 5 and 6. The low speed crank mechanism 5 is for an accurate movement of the telescope where the graph curve is not too steep, while the high speed gear mechanism 6 serves for a very quick motion of the telescope where the curve is approaching parallelism with the y-axis.

The cranks 5 and 6 operate through a gear train 12 which is connected to rotate a Selysn generator 13, and that generator (Fig. 1) is arranged to control the movement of a companion Selysn motor 14 that governs the lateral movement and speed of a stylus that shapes the final enlarged or record curve. The film carrier or slide 7 may be moved by its driving motor through an over-riding clutch 15, shown in Fig. 6, which is adapted to permit positioning the film graph 1 relative to the microscope cross-hairs at the start, and which will provide for returning the slide 7 to a starting position at the end of a scribing operation. This over-riding clutch thus permits setting the slide as desired without disturbing the driving motor 10 and its variable speed mechanism 11. The film carrying the graph 1 is illuminated by a suitable electric lamp 16 (Fig. 4) positioned beneath the slide 3 and movable therewith.

Figure 3:
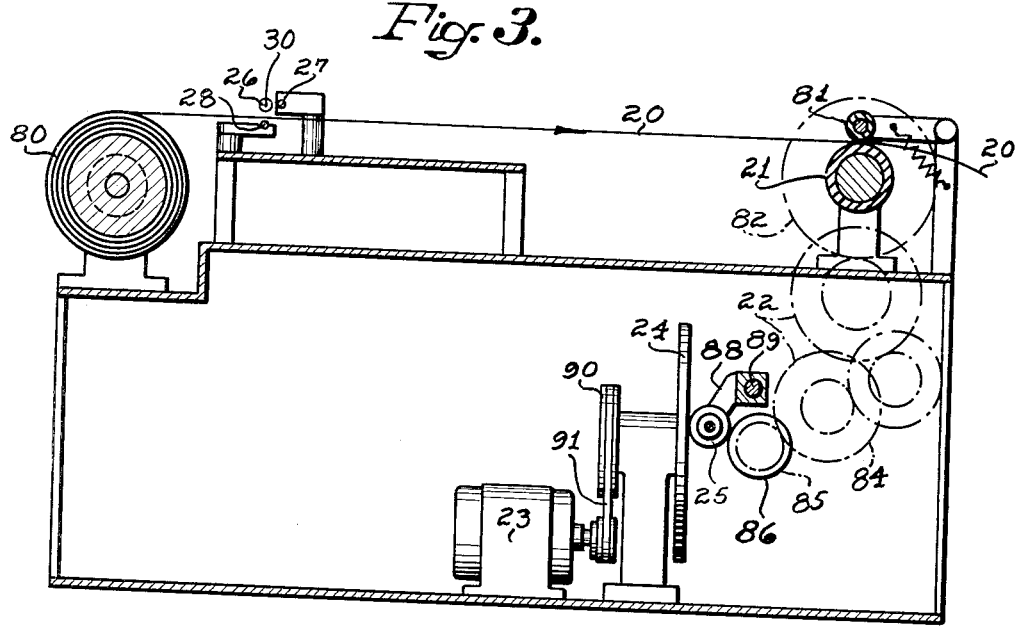
Fig. 3 is a vertical section taken approximately on the line 3—3 of Fig. 2.

The recorder or scribing mechanism comprises a strip 20 of paper or other suitable material (Fig. 3) on which the enlarged or magnified graph is to be made. The graph 1 may be very long in one direction, particularly the x-axis coordinate, and the paper strip is made of a suitable length and width to accommodate the magnified curve. This long and narrow strip of paper is driven lengthwise by a suitable roller 21 arranged for frictionally driving the same. The roller is driven by a gear train 22 which is in turn driven by a constant speed motor 23 through a variable speed mechanism comprising a friction disc 24 driving an adjustably positioned roller 25 connected to the gear train. By manually varying the position of the driven roller radially over the face of the friction disc, the speed of linear movement of the recording paper strip 20 is varied. This speed determines the x-axis dimensions of the curve, since a lower speed movement of the paper relative to the movement of the graph 1 would serve to compress the curve longitudinally, while a higher speed would stretch the curve as to that x-coordinate.

The recording stylus that is adapted to mark on the moving strip may be of various types, such as an inking pen or a pencil of light working on a sensitized photosensitive film. I prefer to make the desired record curve by means of an electrical stylus adapted to provide an electric spark which operates to perforate the moving strip at closely spaced intervals and to leave a visible record of the row of perforations. This spark may be provided by a movable metal stylus 26 (Figs. 1, 3 and 5) having a point or sharp edge arranged close to the paper and adapted to transmit a spark through the paper. This metal stylus is freely moved by means of a sensitive supporting and guiding mechanism, and it receives the electric charge from a rod 27 arranged laterally close to the stylus but not touching and interfering with its movement. The rod 27 extends transversely of and perpendicular to the direction of paper strip movement and parallel to the plane of the paper. The stylus is mounted to move parallel with the axis of the rod 27 so that the distance spacing of the stylus 26 from both the rod and the paper remains constant. Beneath the paper is a wire or rod 28 parallel to the rod 27 adapted to act as the other terminal of the double spark gap formed by the stylus located between and slightly spaced from the rods 27 and 28. The electrical energy is supplied by a suitable high voltage generator and condenser with an interrupter. Thus a succession of sparks jumping between the movable stylus 26 and the upper rod 27 and the lower wire or rod 28 serves to burn a series of holes through the moving paper. The interrupter operates at such a rate that the perforations are very close together and form what may be considered a substantially continuous graph or trace 29 (Fig. 1).

The metal stylus 26 is preferably shaped as a double convex disc having a sharp circular periphery. The stylus is delicately suspended on a strong endless thread 30 (Figs. 1 and 5) which is suitably tensioned by a spring 31 so as to hold the stylus at the correct distance from but close to the paper 20. This thread is lead by suitable pulleys and wound one turn around a drum 32 arranged to be rotated in either direction by the Selsyn motor 14 which is electrically connected to and movable in synchronism with the Selysn generator 13 governed by the microscope movement. The Selsyn motor 14 has a gear train 33 (Fig. 1) which governs the motion of the stylus 26 in accordance with the multiplication of microscope motion provided by the apparatus. Because of the step-up gear train 12, the Selsyn generator 13 is rotated through many turns for a very slight lateral motion of the microscope, and the Selsyn motor 14 is driven in angular synchronism with the Selsyn generator. Therefore the rotary motion of the Selsyn motor 14 is to be stepped down by the gear train 33 (Fig. 1) to the desired extent of reduction of speed for the stylus 26, so that one may get any desired ratio of y-axis enlargement for the graph. This step-up and step-down gear system reduces any error in the graph shape that might be caused by a lack of synchronization of the two Selsyn elements. Thus the Selsyn motor 14 moves the spark gap stylus 26 delicately to that magnifying extent which is required to enlarge the final curve according to the lateral or y-axis movement of the microscope, while the movement of the paper strip provides the x-axis enlargement. One may vary the speed of the gear train 33 by changing the gears or by the use of a suitable variable drive. Thus an 8 to 1 enlargement, suggested as an example of this curve enlargement for both coordinates, may be varied as desired. In this way any enlargement of the curve along its x- and y-axes may be accomplished without enlarging the thickness or materially changing the shape of the curve itself except as is caused by manual variation in the y-axis movement of the microscope which is under the operator's control. It will be appreciated that a sine wave curve, for example, having definite y-coordinates and a definite wave length may be stretched out to leave the maxima and minima points of the wave at the same or at greater y-elevations so that either or both of the x- and y-axis coordinates may be magnified to the same extent or differently.

Figure 4:
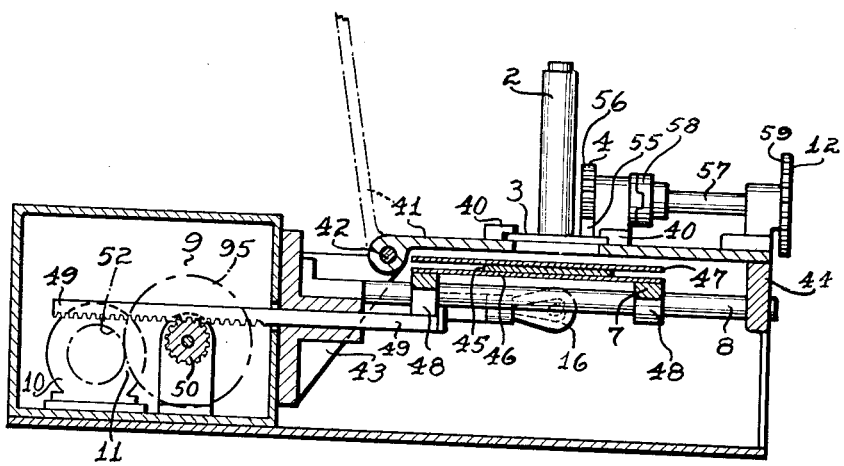
Fig. 4 is a vertical section taken on the line 4—4 of Fig. 1.

In view of the above description of the major features of the invention, it will be appreciated that various details of construction may be employed such as those illustrated in the drawings. Referring particularly to Figs. 1 and 4, the microscope 2, which is of suitable power, is mounted vertically on a slide 3 held between slide ways 40 on the top of a table 41. That table is pivotally mounted at 42 on an arm 43 carried by the framework of the apparatus, so that the table may be lifted into the position shown in dotted outline in Fig. 4 and provide access to the film graph carrier 7 therebeneath. When the table 41 is lowered into an operative position, its forward end is supported on a cross bar 44 or other suitable device carrying the front ends of slide supporting rods 8 and so prevents interference by the table with the movement of the slide or graph carrier 7. The Selsyn generator 13 and associated gear mechanism 12 are mounted on the tiltable plate 41.

The film 45 may be suitably mounted on the sliding carrier 7. It is shown in Fig. 4 as being held between a lower horizontal glass supporting plate 46 and an upper glass plate 47 resting on the film which serve to hold the film smooth and immovable relative to the carrier 7. The plate 41, the slide 3 and the plates 46 and 47 are transparent or are provided with cooperating holes of suitable size so that the microscope may view the film 45 and the latter may be illuminated by the lamp 16. The metal carrier 7 has depending lugs 48 provided with parallel cylindrical bearing openings therethrough and so arranged that the carrier plate 7 may slide horizontally on the two parallel cylindrical rods 8. The left hand lug 48 is connected to the rack bar 49 slidably mounted in a boss on the box carrying the drive mechanism 11 and motor 10. The gear 50 of the reduction gear unit 11 which drives the rack bar is suitably mounted in bearings and is driven by another gear 52 on the end of the shaft of the driving motor 10. The associated gears of the mechanism 11 may be exchanged for other suitable gears so as to vary the speed of the rack bar drive, or if desired, the motor 10 may be a suitable variable speed electric motor arranged to drive the rack bar at a desired uniform rate. This driving rate is of course very slow and is so controlled that the operator will have ample time for viewing the graph 1 and moving the microscope 2 laterally as required to keep the cross-hairs of the microscope on the graph 1 while the graph carrier 7 is moving the graph film 45 lengthwise as indicated in Fig. 1.

The mechanism for moving the microscope slide 3 laterally of the film graph comprises a rack bar 55 (Fig. 1) of the rack and pinion device 4 and a meshing pinion 56 carried on a shaft 57 and driven through a suitable clutch 58 that is controlled as desired to permit adjustment of the microscope. The shaft 57, which is suitably mounted, has a gear 59 meshing with a small gear 60 fixed on a stub shaft which is connected to a larger gear 62 carrying the crank handle 6. Thus manipulation of the crank handle 6 serves to rotate the comparatively fast speed reduction gear mechanism 59 and 60 and drive the microscope slide 3 laterally at a manually controlled rate. The other crank 5 is connected through a small gear 64 with a larger gear 65 fixed on a short stub shaft which further carries a small gear 66 driven thereby and intermeshing with the large gear 62. Thus this further train of reduction gears connects the handle 5 with the reduction gears controlled by the crank 6 and gives a still slower speed motion of the microscope slide. Hence the crank 6 may be considered as a comparatively fast speed drive while the other gives a much slower speed. It is to be appreciated that the operator is viewing the film graph through a microscope, and that to maintain the cross-hairs of the microscope on a very small graph 1 will require a minute movement of the microscope. The operator, having his hands on both of the cranks 5 and 6, can therefore, after a little practice, move one or the other of the cranks slowly or rapidly to maintain that cross-hair contact.

The gear 64 is keyed on the shaft of the Selsyn generator 13, so that these various reduction gears serve to connect the shaft of the Selsyn generator 13 to the microscope and in that way constitute a step-up drive mechanism, so that the Selsyn generator 13 rotates through a large angle or even many turns for a very slight movement of the microscope. As understood by those familiar with Selsyn mechanisms, the angular movement of an armature of the generator 13 will be almost exactly duplicated by a similar angular movement of the Selsyn motor 14 which controls the scribe recording apparatus.

The Selsyn or servomotor system may be of any suitable type. In general, it comprises an alternating current generator 13 (Fig. 5) and a synchronous motor 14 in which the stators are each built like a three phase induction motor. The rotor of each has a bobbin type of core provided with a single winding energized from a single phase source of alternating current. The two rotors are connected in parallel with a source of alternating current conducted through suitable slip rings. The three corresponding taps of the y-windings of the two stators are connected together. In its operation, the rotor of the generator 13 provides an alternating field cutting the windings of its stator and thereby induces a secondary current in that winding which sets up a corresponding field polarity in the stator of the motor 14, so that the rotor of that motor has an induced field which is the same as that of the generator 13. Hence the rotor of the synchronous motor 14 will tend to stand at the same angle relative to its stator as does the rotor of the generator 13, and since the E. M. F. that is induced in each winding is equal, there is normally no circulatory current. If, however, the rotor of the generator 13 is turned through a given angle, there will be a phase displacement between the E. M. F. induced in the stator of transmitter 13 and that in the receiver stator of the motor 14, and the resultant circulatory current between the two stator windings will pull the rotor of the receiving set 14 to the same angular position as that of the rotor in the transmitter set 13. Hence the rotor of the motor 14 will make the same angular or rotative movement as does the rotor of the generator 13.

The synchronous motor 14 drives the winding drum 32 through a reduction speed gear train 33 that is suitably mounted in the box 68 (Fig. 1). This gear train has such a drive ratio that it will move the stylus 26 at the required rate of magnification as compared with the microscope movement. The drum 32 is turned in opposite directions in accordance with the movement of the rotor of the generator 13, and this serves to move the stylus 26 back and forth as the paper 20 is drawn thereunder in the direction of the arrow (Fig. 1).

Figure 5:
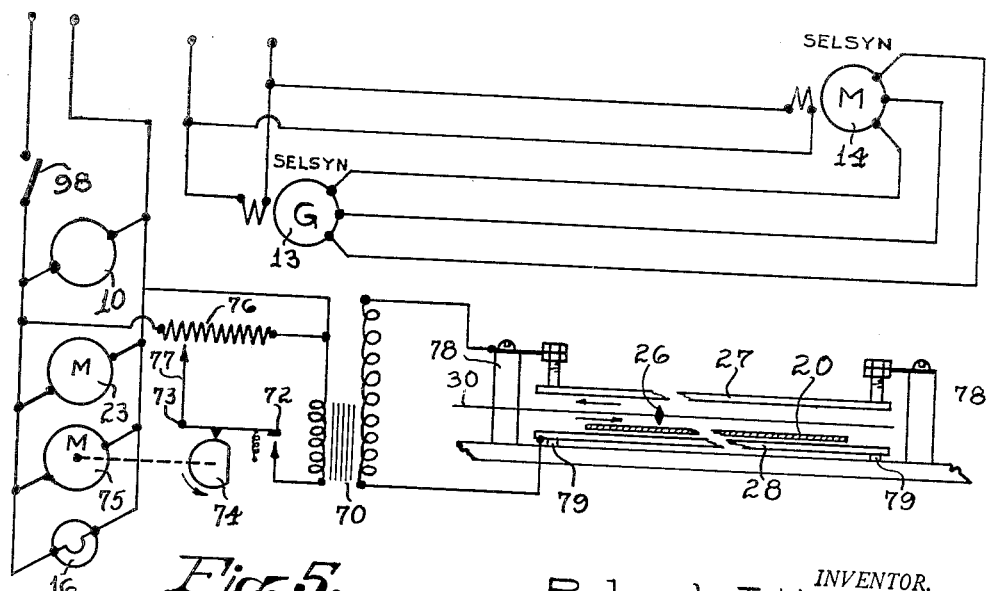
Fig. 5 is a wiring diagram of the major electrical features of the device and which shows diagrammatically the spark production and paper perforation.

The electric spark for the stylus may be suitably generated. As shown in Fig. 5, a suitable transformer 70 has its secondary connected directly to the rods 27 and 28, which are properly spaced close to the disc shaped stylus 26 so that the spark will jump to the stylus between the rods and consequently through the paper 20 therebetween. The primary of the transformer is in series with an interrupter 72 in which the movable spring pressed arm of the make and break contact is lifted about its pivot 73 by means of a cam 74 of suitable shape. This cam is rotated by a constant speed electric motor 75, the speed of which is adjusted to insure that the spark perforations in the paper are spaced far enough apart to prevent cutting the paper and yet close enough to provide a fairly continuous curve 29. The spark voltage can be varied by a voltage divider comprising a suitable resistance 76 and a movable contact arm 77 arranged as illustrated in Fig. 5. The two rods 27 and 28 are suitably mounted on insulator posts 78 and 79 and various precautions will be taken to insure satisfactory operation of the spark circuit. The transformer may be of such a type as to give 10,000 volts, or as desired.

Figure 2:
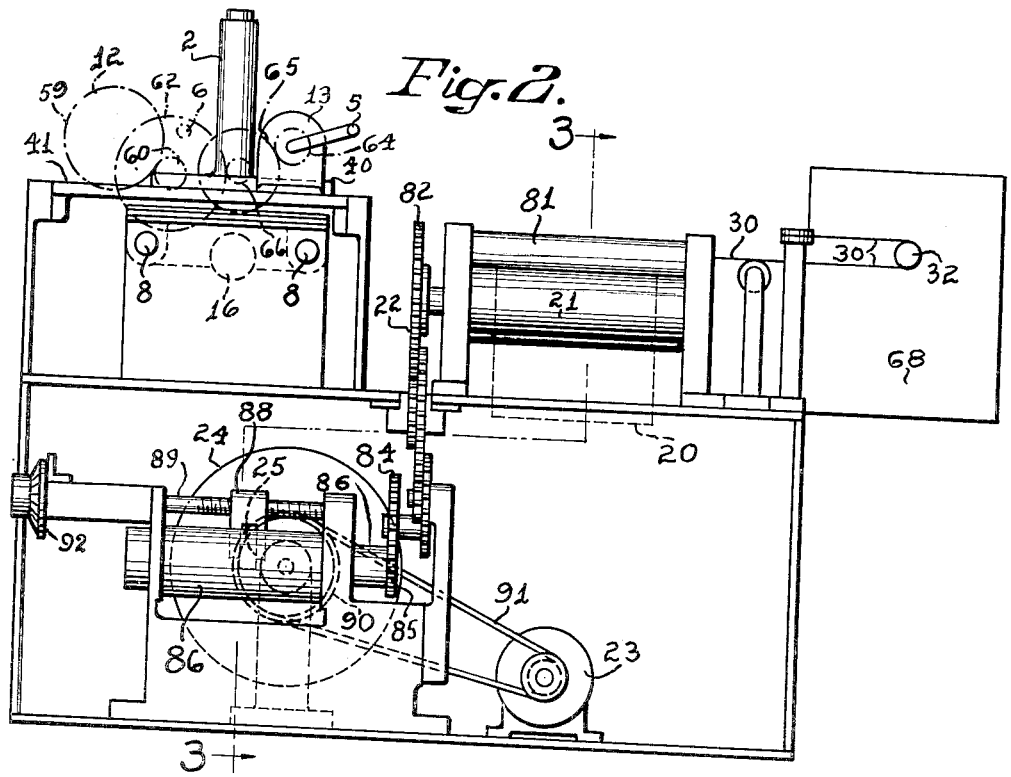
Fig. 2 is a somewhat diagrammatic end view taken on the line 2—2 of Fig. 1.

The paper strip 20 may be drawn forward from a paper roll 80 (Figs. 1 and 3) by means of the driven roller 21 above which is a spring pressed roller 81 arranged to provide the necessary friction. The roller 21 is suitably mounted on supports and has a large gear 82 keyed on its shaft which is driven through the reduction speed gear train 22. This train comprises a drive gear 84 (Figs. 2 and 3) meshing with a smaller drive gear 85 on the end of a long roller 86. This roller 86 frictionally engages the narrow drive roller 25 pivotally carried on a slide arm 88 which is threaded on the screw shaft 89 and moved thereby parallel with the face of the friction disc 24. The shaft is suitably adjusted by a dial on its outer end. These parts are so arranged that the drive roller 25 may be moved radially from near the center outwardly toward the periphery of the drive disc 24 while remaining in rotative contact with both the roller 86 and the drive disc. The drive disc 24 is suitably mounted on a shaft carrying the pulley 90 connected by a belt 91 to the drive pulley of the electric motor 23. A dial 92 on the end of the screw shaft 89 serves for moving the intermediate friction roll 25 and holding it in any desired driving position. Thus the speed transmitted to the paper strip 20 from the constant speed electric motor 23 through the reduction gears 22 may be varied accurately as desired. A variation of the position of the drive roller 25 accordingly serves to change the magnification of the x-coordinate of the curve 29 (Fig. 1), and this control is entirely independent of the control of the y-axis magnification. The later may be varied by changing the gears of the reduction speed mechanism 33 (Fig. 1) and/or the gears of the gear train 12. The gear train 12 governs the rotational movement of the rotor of the Selsyn generator 13, and the gear train 33 governs the reduction in rotor motion of the drum 32 which the synchronous motor 14 drives.

Figure 6:
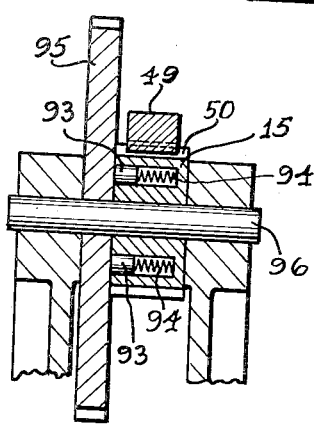
Fig. 6 is a fragmentary sectional detail on the line 6—6 of Fig. 1 showing the driving clutch mechanism for moving the film graph.

The overriding clutch 15 may comprise, as shown in Fig. 6, friction pins 93 mounted in axially aligned holes in the gear 50 and pressed by means of springs 94 against the face of the gear 95 which is driven by the gear 52 on the shaft of the motor 10. The gears 50 and 95 are freely mounted on the shaft 96 so that the power from the motor 10 is transmitted to the rack bar 49 only through the friction drive. This permits the rack bar and the carrier 7 to be moved relative to the motor to any desired position. A similar construction may be employed for the clutch 58 which connects the microscope rack 55 to the Selsyn generator 13 and the hand operated levers 5 and 6. It will be appreciated that various other mechanical constructions may be employed in this apparatus and suitable modifications made to accomplish the purposes above described.

The operation of the device will be apparent. The operator places on the slide or carrier 7 the photographic film 45 carrying the graph 1 which is to be magnified. By means of the two slip clutches 15 and 58, the carrier and the microscope are adjusted to positions where the microscope is exactly aligned with the beginning of the curve 1, such as at the right hand end. Previously, the various speed mechanisms have been adjusted to give the desired magnification of both the x- and y-coordinates of the curve, such as an equal magnification of eight times. Then, while the operator manipulates the cranks 5 and 6 so as to maintain the cross-hairs of the microscope exactly on the curve, the motors 10 and 23 controlled by the switch 98 (Fig. 5) are started in operation and thus the film carrier 7 is gradually moved toward the right. As the operator adjusts the position of the microscope by the cranks 5 and 6 and holds the cross-hairs on the curve 1, the Selsyn generator 13 is rotated in accordance with the movement of the microscope slide and this causes the Selsyn motor 14 to move through the same angular distance and in the same rotative direction and thus through its reduction speed mechanism 33 to move the stylus 26 laterally of the traveling paper 20. The transformer and interrupter circuit causes a succession of spark perforations and discolorations to appear as the line 29 on the moving paper. The x-axis enlargement is accurately determined by the predetermined relationship of the speeds of the film carrier 7 and the paper strip 20. The y-axis enlargement of the curve depends upon the relative gear ratios of the two Selsyn mechanisms 12 and 33. The shape of the curve is governed by the operator's skill, but by adjusting the speeds of the paper and film carrier driving mechanisms within his capabilities, the operator will be able to follow the curve accurately with the microscope, and the deviations from the original curve will be so minute as to be negligible. There are many types of curves produced as oscillograph or photographic records which require amplification for careful study, and this apparatus will amplify the curve as much as is within the capacity of the microscope and the ability of the operator to maintain the microscope bearing correctly on the graph image. Various other advantages will be apparent in this construction.

The above disclosure is to be interpreted as describing a preferred embodiment of the invention and not as imposing limitations on the appended claims. It, however, will be appreciated that various changes may be made in this construction. The microscope may be replaced by any suitable type of viewer or a follower having a fine point adapted to be located accurately on the linear graph. The relative movement of this follower or viewer and the graph to be reproduced or enlarged as to either or both coordinates serves to control through a suitable servomotor system the relative movement between the recording stylus and its associated strip, so that the record mark produced by the stylus will be related to the original curve with either an equal or a different magnification as to the two coordinates. Various equivalent constructions will accomplish this general purpose within the scope of this invention.

I claim:

1. Apparatus for making a linear record related to a linear graph comprising a movable support for the graph, power operated mechanism for moving the graph support in the direction of one coordinate at a uniform rate, a laterally movable graph follower, manually operated mechanism for moving the follower laterally in the direction of the other coordinate so that it may follow the moving graph, a record strip, means for supporting the strip for an independent linear movement, a laterally movable stylus mounted for marking the strip, power mechanism for moving the record strip in a direction related to the graph movement and at a uniform rate independent of and different from that of the graph movement which determines one coordinate magnification of the graph, and independent mechanism controlled by the lateral movement of the follower for moving the stylus laterally relative to the moving record strip to a variable distance and at a rate coordinated with but different from the graph follower movement which determines the second coordinate magnification, so as to produce a linear record related to the graph in which the two coordinates of the graph are independently varied in the record to predetermined proportions.

2. Apparatus for making a linear record related to a linear graph comprising a movable support for the graph, adjustable power driven mechanism for moving the graph support at a uniform variably selected rate in the direction of a first coordinate, a graph follower mounted for lateral movement in the direction of a second coordinate, manually controlled mechanism for moving the follower laterally so that it will follow the moving graph, a record strip, a support mounted for moving the strip in a direction related to but independent of the movement of the graph support, power driven adjustable mechanism for moving the record strip at a uniform but variably selectable rate which determines the magnification of the graph relative to said first coordinate, a stylus, a stylus support independent of the graph follower which provides for lateral movement of the stylus to mark the record strip, power mechanism automatically driven by and in timed relation with the follower movement which causes the stylus to move laterally in the direction of the second coordinate and mark the moving strip, and means for varying the relative rates of movement of the follower and stylus so as to provide a predetermined and independent magnification of the curve relative to the second coordinate.

3. Apparatus according to claim 2 in which the follower comprises a movable support, a microscope mounted thereon in position to view the graph and manually operated alternately employed low and high speed mechanisms connected to move the microscope support for following the graph.

4. Apparatus for making a linear record related to a linear graph comprising a movable support for the graph, power operated mechanism for moving the graph support in the direction of a first coordinate at a uniform rate, a laterally movable graph follower, manually operated mechanism for moving the follower laterally in the direction of a second coordinate, a Selsyn system including a generator having a rotor, mechanism connecting the rotor with the graph follower so that the angular displacement of the rotor varies with the graph follower movement, a record strip, means for supporting the strip for a linear movement independent of but related to the graph movement, a stylus, a support providing for lateral movement of the stylus for marking the strip, a Selsyn motor in said system having a rotor whose angular position is governed by the generator rotor, mechanism connecting the motor rotor with the stylus for moving it, said Selsyn connected mechanisms providing a second coordinate magnification of stylus movement relative to that of the follower, and power mechanism for moving the record strip at a uniform controlled rate different from and independent of the graph movement which provides a first coordinate magnification of the curve in the direction of strip movement.

5. Apparatus according to claim 4 comprising a step-up gear mechanism connecting the Selsyn generator rotor with the follower moving mechanism and a step-down gear mechanism driven by the Selsyn motor rotor which moves the stylus, one of said gear mechanisms providing for a change of speed of the stylus relative to that of the follower for varying the second coordinate magnification.

6. Apparatus according to claim 4 comprising a lower electrical conductor mounted beneath and extending laterally of the record strip, an upper electrical conductor above the strip parallel with the lower conductor, the stylus being an electrical conductor traveling close to the upper conductor and the record strip and serving to transmit a spark from the upper to the lower conductor through the strip, and an electrical circuit to provide said spark including an interrupter and motor mechanism for interrupting the circuit and causing a spark, the speed of said motor mechanism being adjustable for varying the rate of spark production to cause the sparks to perforate the record strip at spaced intervals.

References Cited in the file of this patent

UNITED STATES PATENTS

| | | |
|---|---|---|
| 1,074,776 | Davis | Oct. 7, 1913 |
| 1,943,205 | Coradi | Jan. 9, 1934 |
| 2,322,653 | Mitchell | June 22, 1943 |
| 2,369,284 | Dale | Feb. 13, 1945 |
| 2,442,098 | Shewell et al. | May 25, 1948 |
| 2,494,663 | Lobosco | Jan. 17, 1950 |
| 2,517,502 | Miller | Aug. 1, 1950 |
| 2,557,447 | Masi | June 19, 1951 |

FOREIGN PATENTS

| | | |
|---|---|---|
| 554,503 | Germany | July 9, 1932 |
| 604,159 | Germany | Oct. 15, 1934 |